3,067,008

PROCESS FOR RECOVERING TUNGSTEN AND VANADIUM VALUES FROM ORGANIC SOLVENTS

Roger L. Pilloton, Niagara Falls, N.Y., assignor to Union Carbide Corporation, a corporation of New York
No Drawing. Filed Dec. 9, 1957, Ser. No. 701,287
4 Claims. (Cl. 23—140)

This invention relates to a process of recovering metal values from organic solutions.

A common technique employed in the separation and recovery of metals from their ores entails the leaching of the ore with an aqueous leaching solution and separation of the metal values from the aqueous solution by selective extraction with organic solvents. In some instances an organic solvent is employed directly for the leaching of the ore. In either case, however, it is the customary procedure to strip the metal values from the organic phase with an aqueous stripping solution and to then recover the metal values from the pregnant strip solution.

It is an object of this invention to provide a process for the recovery of metal values in organic solutions directly from the solution without the necessity for an aqueous stripping.

Other objects will be apparent from the disclosure and appended claims.

The process which satisfies the objects of this invention comprises passing dry ammonia through the pregnant organic extracting solution, whereby the metal values are precipitated as ammonium salts of acids of the metal values. This precipitate may then be roasted to a pure oxide. The ammonia evolved during the roasting process may be recovered, purified, dried and recycled for reuse in the process. If the pure metal is desired, the roasted oxide may be reduced with hydrogen.

To illustrate the process of the present invention, dry gaseous ammonia was blown through 900 milliliters of methylisobutyl ketone containing 4.1 grams of tungsten. In two minutes all of the tungsten was precipitated as ammonium paratungstate.

In another example of the invention, anhydrous, gaseous ammonia was blown through 100 milliliters of methylisobutyl ketone containing vanadium values, expressed as $V_2O_5$, in an amount of 9.1 grams per liter. All of the vanadium was precipitated as ammonium vanadate.

In addition to the recovery of tungsten and molybdenum the process is equally applicable to the recovery of molybdenum, uranium, and the other metals of groups VB and VIB of the periodic table (Handbook of Chemistry and Physics, 31st Edition, page 336, Chemical Rubber Publishing Company, 1949) from the organic extracting solvents which are employed to recover the metal values from aqueous solutions.

What is claimed is:

1. In a process for the recovery of tungsten by selective extraction processes whereby tungsten values are transferred to a substantially water-immiscible organic solvent, the improvement which comprises recovering said tungsten values directly from the pregnant organic solvent by passing dry, gaseous ammonia through the pregnant solvent whereby said tungsten values are precipitated as ammonium paratungstate, and separating the precipitated ammonium paratungstate from the organic solvent.

2. A process in accordance with claim 1 wherein the precipitated-and-separated ammonium paratungstate is roasted to tungsten oxide and the ammonia evolved during said roasting is recovered, purified, dried, and recycled for additional precipitation of metal values.

3. In a process for the recovery of vanadium by selective extraction processes whereby canadium values are transferred to a substantially water-immiscible organic solvent, the improvement which comprises recovering said vanadium values directly from the pregnant organic solvent by passing dry, gaseous ammonia through the pregnant solvent whereby said vanadium values are precipitated as ammonium vanadate, and separating the precipitated ammonium vanadate from the organic solvent.

4. A process in accordance with claim 3 wherein the precipitated-and-separated ammonium vanadate is roasted to vanadium oxide and the ammonia evolved during said roasting is recovered, purified, dried, and recycled for additional precipitation of metal values.

References Cited in the file of this patent

UNITED STATES PATENTS

| | | |
|---|---|---|
| 1,426,517 | Sulzberger | Aug. 22, 1922 |
| 2,227,833 | Hixon et al. | Jan. 7, 1941 |
| 2,261,371 | Hixon et al. | Nov. 4, 1941 |
| 2,765,270 | Brenner | Oct. 2, 1956 |
| 2,791,499 | Clegg et al. | May 7, 1957 |
| 2,795,481 | Hicks | June 11, 1957 |
| 2,798,831 | Willcox | July 9, 1957 |

OTHER REFERENCES

Werning et al. in "Industrial and Engineering Chemistry," vol. 46, No. 4, pages 644–652, 1954.

Hopkins, "Chemistry of the Rarer Elements," D. C. Heath and Co., New York, 1923, pages 220 and 287.